United States Patent [19]

Jolliffe et al.

[11] 4,059,315
[45] Nov. 22, 1977

[54] CLEAT ANCHOR FOR FLEXIBLE VEHICLE TRACK

[76] Inventors: James D. Jolliffe, 4844 Kimball, S.E., Grand Rapids, Mich. 49508; Allen D. Sessions, 919 Arhana Crest Drive, Middleville, Mich. 49333

[21] Appl. No.: 646,236

[22] Filed: Jan. 2, 1976

[51] Int. Cl.² .............................................. B62D 55/28
[52] U.S. Cl. ................................. 305/35 EB; 85/37; 85/50 R
[58] Field of Search ............. 305/35 EB, 54; 198/198; 85/37, 50 R; 151/38

[56] References Cited

U.S. PATENT DOCUMENTS

| | | | |
|---|---|---|---|
| 3,165,364 | 1/1965 | Hardman et al. | 305/35 EB X |
| 3,395,602 | 8/1968 | Strange | 85/50 R X |
| 3,422,721 | 1/1969 | Yonkers | 85/50 R X |

*Primary Examiner*—Robert B. Reeves
*Assistant Examiner*—John P. Shannon
*Attorney, Agent, or Firm*—Price, Heneveld, Huizenga & Cooper

[57] ABSTRACT

An anchor is disclosed for securing a cleat to the flexible web of a driven member such as the drive track of a vehicle as, for example, a snowmobile or the like. The anchor includes a generally rectangular backing plate having upstanding flanges along its two edges at right angles to the direction of movement of the drive track and a domed central portion forming a concave pocket in the face seated against the web. The joint or transition area where the flanges join the central portion of the plate is smoothly rounded or rolled. A fastener holds the cleat and plate against opposite faces of the web and compresses the web between them sufficiently to deform the web to fill the pocket and press against the shank of the fastener.

4 Claims, 9 Drawing Figures

CLEAT ANCHOR FOR FLEXIBLE VEHICLE TRACK

DESCRIPTION OF THE PRIOR ART

Prior to the invention described herein, metal-drive cleats were fastened by rivets to the flexible drive track of snowmobiles. In some cases, the bearing area was increased by using a washer beneath the rivet head with the heads of the rivets seated against the back face of the drive track. However, the forces exerted on these drive cleats during operation of the snowmobile often caused separation of the cleat from the drive track by cutting or tearing or both of the flexible material of the drive track around the rivet head. This allowed the rivet head to pull through the drive track. This occurred even though special rivets with large diameter heads were used.

Therefore, one object of this invention is to provide a device and method of securing a drive cleat to a supporting and driving member of flexible material which will provide superior resistance to detachment due to tearing or ripping of the flexible material.

Another object of this invention is to provide a method of attachment wherein standard, commercially available fasteners such as rivets can be used.

It is a further object of this invention to provide a device for securing a metal member such as a cleat to flexible material which will provide materially increased resistance to tearout of the fastener even though the forces acting on the fastener from time to time act in different directions.

A further object of the invention is to eliminate the cutting action of the fastener when the forces acting on it tilt or twist the fastener so that it is inclined to the plane of the flexible web of the drive track.

DESCRIPTION OF A PREFERRED EMBODIMENT

Figure 1:
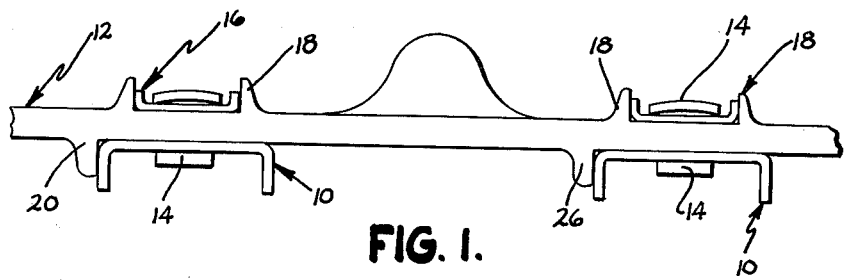
FIG. 1 is a fragmentary side elevation view of a flexible drive track and drive cleat assembly of a snowmobile, incorporating one embodiment of the instant invention for fastening the metal drive cleats to the flexible drive track.
Figure 2:
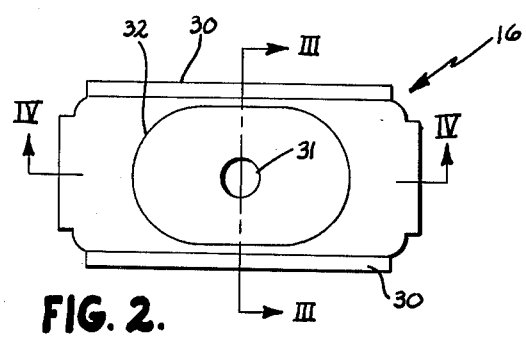
FIG. 2 is a plan view of the cleat anchor plate used in the embodiment of the invention of FIG. 1.
Figure 3:
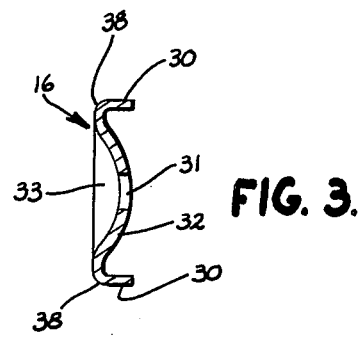
FIG. 3 is a cross-sectional view of the cleat anchor plate taken along the plane III—III of FIG. 2.
Figure 4:
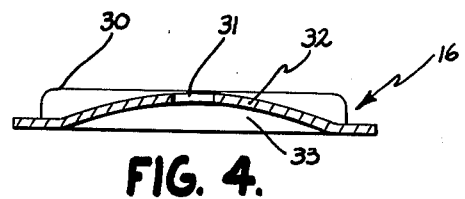
FIG. 4 is a cross-sectional view of the cleat anchor plate taken along the plane IV—IV of FIG. 2.

Referring now to the drawings, FIG. 1 illustrates a preferred embodiment of this invention wherein a metal drive cleat 10 of conventional construction is fastened to the flexible drive track 12 of a snowmobile by a rivet 14, used in conjunction with the novel cleat anchor plate 16, illustrated in detail in FIGS. 2, 3 and 4. The flexible drive track 12 conventionally used in snowmobiles is a web of reinforced rubber of one-fourth of an inch or more in thickness. While this invention is illustrated and described as applied to snowmobile drive tracks, and the invention has particular utility in this environment, it will be recognized that it has other potential uses such as for attachment of cleats to a conveyor belt.

The drive cleat 10 may be of any conventional construction. It can be a short piece attached by a single rivet or an elongated member extending the width of the flexible member and attached by a number of spaced rivets. The rivet 14 is also of conventional design. The anchor plate 16, however, is specifically constructed to eliminate the problems previously encountered.

Figure 6:
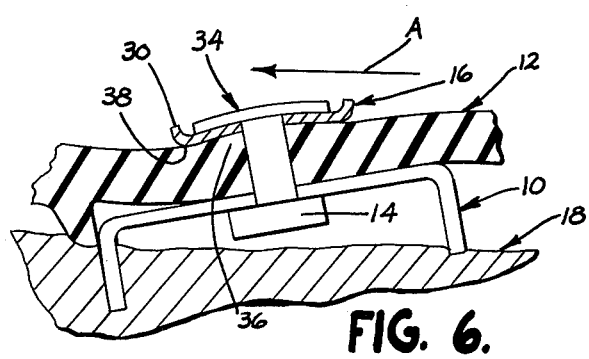
FIG. 6 is a view similar to FIG. 5 but showing type of loading to which the invention is subjected during use.

The anchor plate 16, in its preferred embodiment, is elongated and has a pair of upstanding sides 30 (as seen in FIGS. 2 and 6). A hole 31 for the rivet is provided at the approximate, geometric center of the plate. Surrounding the hole 31, the main body of the plate, between the sides 30, is upwardly domed or arched at 32. This forms a shallow, concave pocket 33 in the bottom face of the plate (FIGS. 3 and 4). In a square plate, this dome would be generally circular, whereas in the elongated plate illustrated, it is elongated lengthwise of the plate, thus assuming a generally oval shape.

The invention can be installed with the rivet 14 inserted from either direction. Irrespective of the direction the rivet 14 is inserted, that portion of the tool which either seats against or forms the rivet head 34 must be concave for positively seating the rivet head 34 against the arched surface of the anchor plate 16. This is very important because the rivet must be firmly held against rocking motion relative to the anchor plate.

Figure 5:
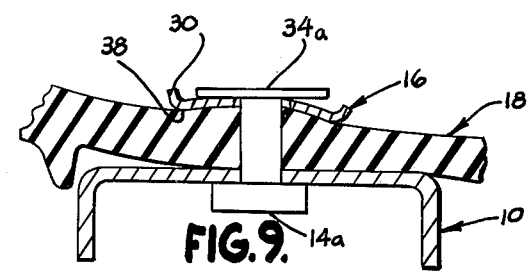
FIG. 5 is an enlarged fragmentary sectional showing the cleat anchor of this invention mounted as a flexible web.

It is also important that during the installation of the rivet 14, adequate squeezing pressure be applied between the cleat 10 and the anchor plate 16 to force the compressible material of the web or flexible drive track 12 to be squeezed up into and fill the pocket 33 as indicated at 36 in FIG. 5. This deformation of the flexible track material also forces the material inwardly around the shank of the rivet, thus, providing firmer and more positive side or lateral bearing for the rivet.

During operation of the snowmobile, the most severe forces tending to separate the drive cleat 10 from the flexible drive track 12 will be applied parallel to the direction of movement of the drive track 12 from either the front or back direction. For this reason, the cleat anchor plate 16 is designed to give increased resistance to tear-through of the rivet in both of these directions. The raised ridges 18 molded into the flexible drive track 12 and extending across the drive track 12 perpendicular to the direction of movement of the drive track 12 help to align the anchor plate 12. Likewise, the drive cleat 10 is positioned, held in alignment and, in normal drive condition is braced by drive lip 20.

Any fore or aft horizontal component of a force acting on the drive cleat 10 will tend to rotate the cleat 10, the rivet 14 and the cleat anchor plate 16 so that one edge of the cleat anchor plate will exert a force against the backface of the drive track 12, tending to cut and tear through it (See FIG. 6 in which arrow A indicates the direction of track movement and B indicates the surface against which it is reacting).

By providing the anchor plate 16, the loads imposed on the rivet which tend to tip the rivet head relative to the flexible web 12 are transmitted to the plate and are spread out over a substantially greater area. Thus, the bearing force exerted per unit area is substantially reduced. Further, it will be seen from FIG. 6 that where the edge of the anchor plate bears on the face of the flexible web 12, instead of the sharp cutting corner characteristic of a conventional rivet head, it has an elongated, smoothly rounded corner 38 which merely rolls over and does not cut the flexible material. Another important factor contributing to the effectiveness of this invention is that the high loading incident to the type of rocking action illustrated in FIG. 6 is reduced by spreading it along the entire length of the anchor plate 16 rather than concentrating it at a few degrees of arc, as occurs with the circular head of a rivet.

Further, the compression of the flexible material to fill the pocket 33 provides a firm support for the anchor plate. This, combined with the shaping of the rivet heat 34 to seat firmly against the exterior of the anchor plate 16, prevents rocking of the rivet 14 relative to the anchor plate. The squeezing of the flexible web 12 to grip the rivet shank tightly prevents the rivet from rocking relative to the flexible web 12. This is important in reducing drive track failure. When the rivet is free to shift radially of the hole in the flexible track, the resulting wear quickly results in structural failure. It also prevents the cleat 10 from rocking and shifting relative to the flexible track. This materially increases the cleat's effectiveness.

Another beneficial effect of compressing the flexible material by the use of the pocket 33 is that the area of the flexible track thus squeezed and deflected is stiffened. Thus, it provides a more firm, deflection resistant support of the cleat and its attachment means.

The overall result of this construction is not only a more positive anchor for the cleat 10 but also the elimination of the tearing action which results from the high unit loadings and sharp cutting action characteristic of conventional fasteners such as rivets.

While, throughout this application the fastener for joining the cleat and the anchor plate has been described and illustrated as a rivet, it will be recognized that other types of fasteners may be used. For example, the hole 31 in the anchor plate 16 could be threaded and a screw substituted for the rivet. Such an arrangement would be less desirable because of the high unit loadings imposed on the threading in the plate.

Figure 7:
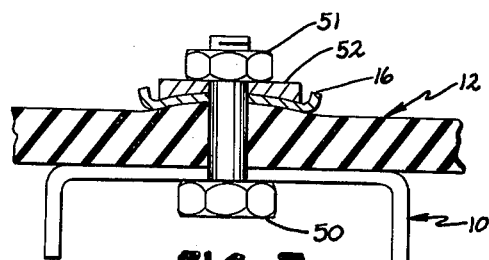
FIG. 7 is a view similar to FIG. 5 but showing a modified construction.

Another alternative would be the substitution of a bolt 50 and nut 51 for the rivet 14 (FIG. 7). It is necessary in this case to use a special washer 52 which will provide a type and area of bearing equivalent to the rivet head 34. The nut and bolt arrangement permits high clamping pressures to be applied to positively squeeze the flexible material into the pocket and around the rivet shank.

Figures 8, 9:
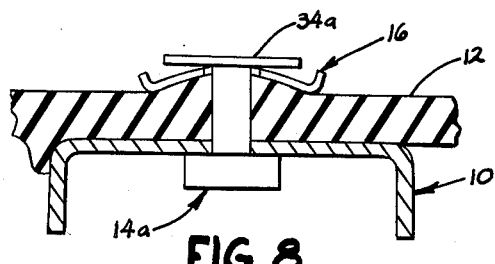
FIG. 8 is a view similar to FIG. 5 illustrating a modified form of the invention.
FIG. 9 is a view similar to FIG. 8 but showing the modified form of the invention under load.

A further modification of the invention is illustrated in FIGS. 8 and 9. In this modification the anchor plate 16, drive track 12 and cleat 10 all are the same as previously described. The rivet 14a, however, is different in that it has a standard flat head 34a. This arrangement permits limited tipping of the rivet before there is any tipping of the anchor plate 16. When the loading is such that some tipping of the anchor plate is required it will tip or rock in the same manner as is shown in FIG. 6. However, due to the protective action of the anchor plate, the rivet head 34a never makes cutting or ripping contact with the flexible track 12. It is important that when the rivet 14a is attached, that the same high squeezing pressure be used as that applied in the case of rivet 14 so that the material of the flexible track is forced up into the concavity in the bottom face of the anchor plate 16. When the flat head rivet 14a is used, the hole in the anchor plate 16 must be oversize to accommodate the rocking action of the rivet.

Various modifications of the subject invention are possible without departing from the principles of the invention. Such modifications are to be considered as included within the language of the hereinafter appended claims unless these claims, by their language, expressly state otherwise.

The embodiments of the invention in which an exclusive property or privilege is claimed are defined as follows:

1. Means for securing a cleat to the flexible web of a snowmobile drive track, said means comprising a fastener having a flat head and a rectangular anchor plate; said plate having a main body and flanges along at least two opposite side edges of said plate, said flanges being substantially normal to the plane of said plate; the juncture between said flanges and said body being smoothly rounded to provide a rolling contact with the flexible web when said plate is rocked relative to the flexible web; an opening for the fastener at the approximate geometric center of said plate; said body surrounding said opening being offset in the direction of extension of said flanges to form a smoothly arched, concave pocket in the face of said plate opposite from said flanges, the ends of said plate having flat planar portions separating the end edges thereof from the ends of said pocket, the face of said arched portion of said body facing in the same direction as said flanges forming a rounded, dome-shaped surface for engaging the head of the fastener in a manner such that relative rocking movement may occur between the fastener head and the body.

2. A flexible track for a snowmobile, said track having an endless flexible web and a traction providing cleat, at least one anchor plate for attaching said cleat to said flexible web, said anchor plate being rectangular and having a main body and flanges along at least two opposite side edges of said plate, said flanges being arranged normal to the direction of movement of said web and extending substantially normal to the plane of said plate; the juncture between said flanges and said body being smoothly rounded to provide a rolling contact with the flexible web when said plate is rocked relative to the flexible web; an opening for a fastener at the approximate geometric center of said plate, said body surrounding said opening being offset in the direction of extension of said flanges to form a concave pocket in the face of said plate opposite from said flanges, said plate being seated against the face of said flexible web opposite from said cleat with said pocket facing said web; a fastener passing through said cleat, web and said plate and squeezing said cleat and plate together to compress said web between said cleat and said plate sufficiently to deform said web to fill said pocket and press the web firmly against the portion of the fastener passing therethrough.

3. A flexible track for a snowmobile as described in claim 2 wherein said plate is elongated parallel to said flanges and said concave pocket is elongated and generally oval in shape and extends substantially the full width of the plate between said flanges, the ends of said pocket being spaced from the ends of said plate.

4. A flexible track for a snowmobile as described in claim 2 wherein said fastener has a head seated against said plate, the surface of said fastener head adjacent said plate being flat and normally seating snugly against said plate only about the perimeter of the opening in said plate through which said fastener passes, and being rockable about its contact with the plate with the perimeter of said opening acting as a fulcrum for said fastener and said plate acting as a shield between said fastener head and said web.

* * * * *